J. ARTKOP.
BREAD MOLDING MACHINE.
APPLICATION FILED MAR. 24, 1919.
1,339,087.
Patented May 4, 1920.
2 SHEETS—SHEET 1.
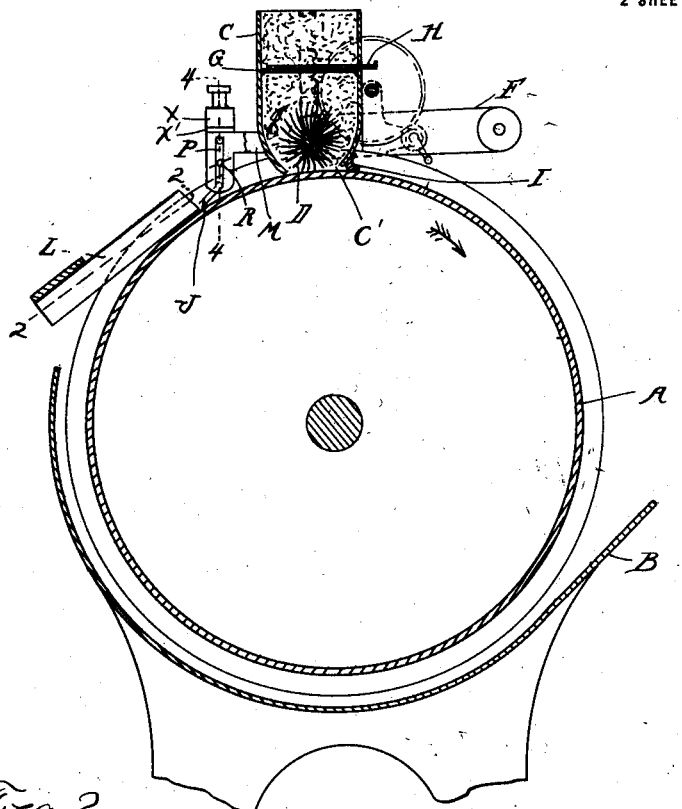
Fig. 1
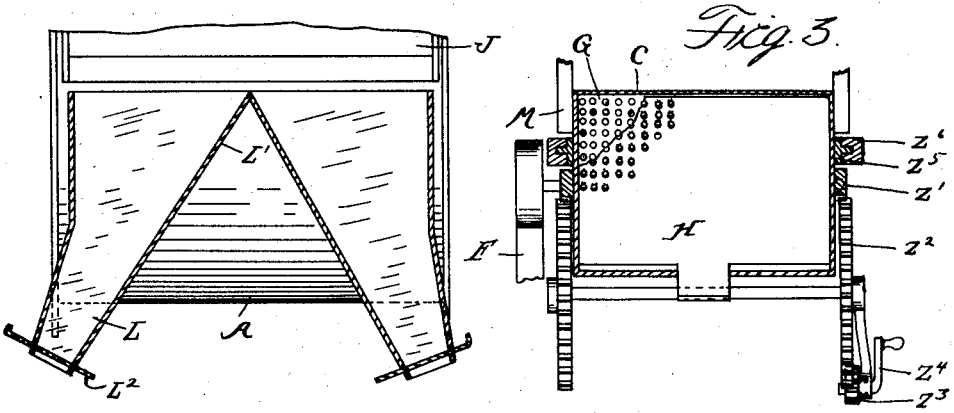
Fig. 2
Fig. 3
Inventor
Jan Artkop

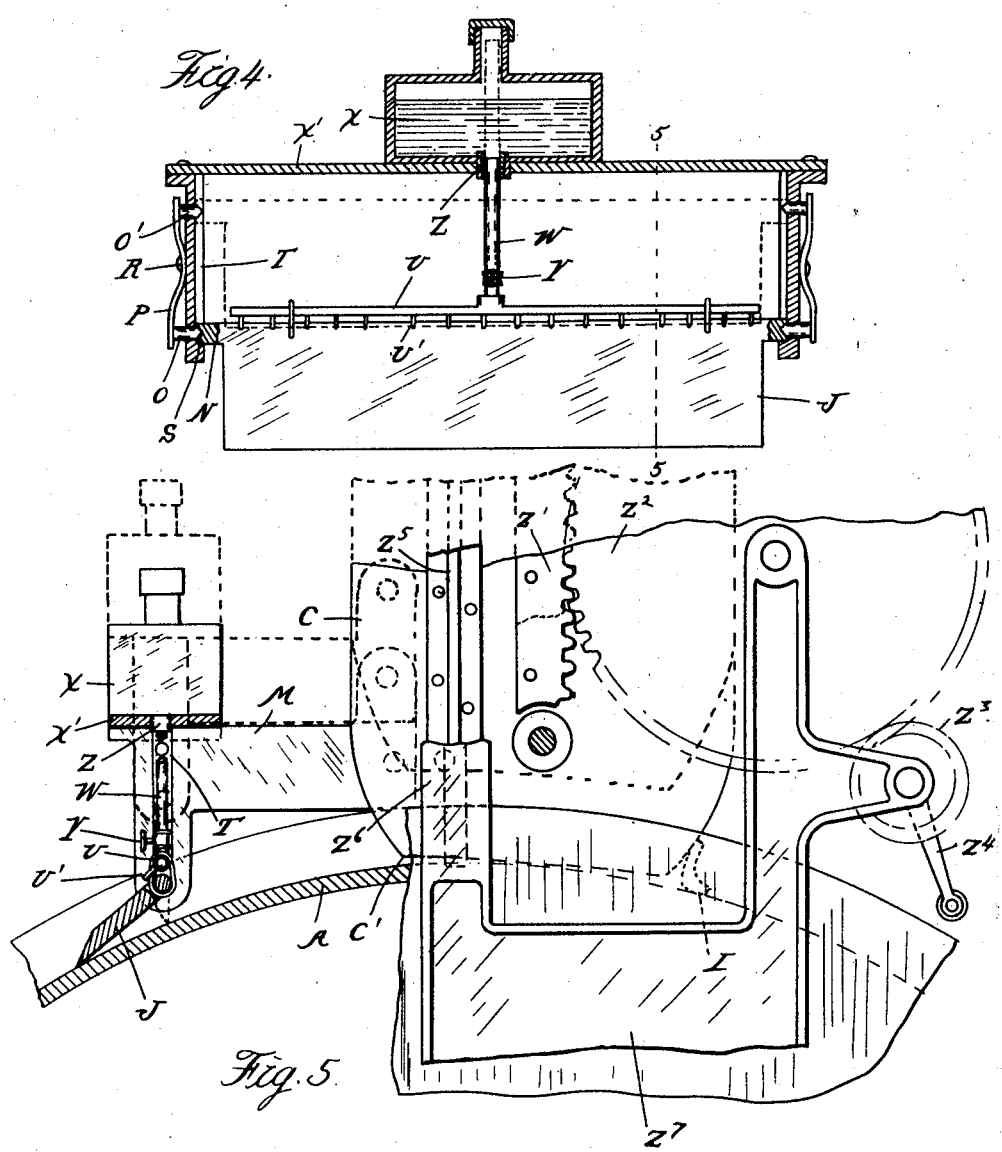

UNITED STATES PATENT OFFICE.

JAN ARTKOP, OF DETROIT, MICHIGAN.

BREAD-MOLDING MACHINE.

1,339,087.  Specification of Letters Patent.  Patented May 4, 1920.

Application filed March 24, 1919. Serial No. 284,633.

*To all whom it may concern:*

Be it known that I, JAN ARTKOP, formerly a subject of the Czar of Russia, having taken out first United States citizenship papers, residing at Detroit, in the county of Wayne and State of Michigan, have invented certain new and useful Improvements in Bread-Molding Machines, of which the following is a specification, reference being had therein to the accompanying drawing.

This invention relates to loaf molding machines and has particular reference to machines wherein the individual loaves are rolled between a rotary drum and an adjacent apron.

The objects of the invention are to provide an improved means for evenly dusting the rotating surface of the drum with flour; an improved arrangement for scraping any accumulations of dirt or dough from said rotating face; means for preventing the scraping blade from becoming unduly heated through frictional contact with the drum; means for raising the scraping blade and the receptacle from which the flour is dusted, so that the same may clear the drum; and means for adjusting said blade independently of said receptacle into or out of contact with the drum.

In the accompanying drawings:

Figure 1 is a view in sectional elevation of a loaf molding machine improved in accordance with this invention, such portions of the machine as are non-essential to an understanding of the invention being omitted;

Fig. 2 is a sectional view of the receptacle for scrapings, the section being taken on line 2—2 of Fig. 1;

Fig. 3 is a plan view of the hopper from which flour is dusted upon the drum;

Fig. 4 is a sectional view showing the scraping knife and its supporting means, the section being taken on line 4—4 of Fig. 1;

Fig. 5 is a sectional view of the same transverse to Fig. 4.

In these views, the reference character A designates a rotary drum, the direction of rotation being indicated by the arrow in Fig. 1, and B is a curved apron extending in spaced relation to the lower portion of the drum A and forming therewith a passage through which the individual loaves may be rolled. A hopper C is mounted adjacent to the drum A above the same and receives flour to be dusted upon the circumferential face of the drum. Said hopper has an outlet in its bottom, as indicated at C', and through said outlet there projects a cylindrical brush D journaled within the hopper and lightly engaging the rotating face of the drum. As indicated by the arrow in Fig. 1, said brush is driven in a reverse direction to the drum, the drive being applied in any suitable manner, as, for example, by the belt F. Said brush turns at a slow rate and constitutes a means for gradually distributing a small quantity of flour evenly over the entire width of the drum as the same turns beneath the hopper. As a further precaution to insure an even distribution of the flour on the circumferential face of the drum, a flexible wiper I, formed preferably of cloth, is secured to the lower portion of the hopper so as to engage the drum, and thus a very uniform distribution of the flour over the circumferential face of the drum is effected. To regulate the supply of flour to the brush D, a perforated horizontal partition G is disposed within the hopper C above said brush and coacts with a similarly perforated slide plate H having an actuating portion extending exteriorly of the hopper, the perforations of the two plates G and H being more or less registered to regulate the supply of flour to the brush.

The reference character J designates a pivotal scraper blade engaging the drum across the entire width thereof in advance of the hopper C, said blade being proportioned in weight to bear upon the drum with a predetermined pressure. With said blade there is associated a receptacle L to receive the scrapings, said receptacle extending from adjacent the edge of the blade in a tangential relation to the drum. Within said receptacle there is located a wedge-shaped deflector L', whereby the scrapings are caused to accumulate in the lateral portions of the receptacle whence they may be withdrawn from time to time through openings at the bottom of said receptacle controlled by sliding closures L².

The scraper blade is supported between a pair of arms M which may be mounted upon the hopper C, said arms being provided with a pair of pivot pins O which engage trunnions N on the blade when the latter is in its normal position of use and being further provided with an upper pair of pivot pins O' with which said trunnions may be engaged when it is desired to hold the blade out of engagement with the drum. The pins O and O' are carried by the extremities of leaf springs P, respectively secured at their center point R to the arms M, the ends of said pins being beveled and the end faces of the trunnions N having corresponding conical sockets S engageable by the pins. The opposing faces of the arms M are vertically slotted, as indicated at T, to guide the trunnions N during shifting of the blade between the lower and raised positions respectively shown in full lines and in dash lines in Fig. 4.

A pipe U is secured to the blade J adjacent the pivotal axis thereof and extends across the entire width of the blade, said pipe being provided with a row of downwardly discharging drip openings U' through which some suitable liquid cooling agent, as, for example, oil, is discharged upon the blade either in fine streams or drop by drop. Thus, the blade is prevented from becoming unduly heated due to frictional engagement with the drum. The cooling agent is supplied to the pipe U through the riser W extending to the tank X supported above the blade upon a cross-bar X', the ends of which engage the arms M, the flow through said riser being controlled by a valve Y. In order to automatically cut off the supply of oil to the riser when the blade is in raised position, said riser in entering the tank X passes through a packed slide bearing Z, the arrangement being such that the inlet of the riser is substantially flush with the bottom of the tank when the blade is in position of use, while said inlet is above the level of the liquid in the tank when the blade is in raised position.

As a means for adjusting both the hopper C and the blade J to simultaneously adjust the same into or out of operative engagement with the drum, vertical racks Z' are mounted upon the respective ends of the hopper and are engaged by gears Z² operable through pinions Z³ and a crank Z⁴. The hopper is supported and guided in its adjustment by engagement of vertical angle bars Z⁵ mounted respectively upon its end walls with channel-forming upward projections Z⁶ from the frame Z⁷ of the machine.

When the machine is not in use, it is preferred to adjust both the hopper and blade up, as is indicated in dash lines in Fig. 5, thus rendering all parts more accessible for cleaning and allowing fresh air to reach the brush. When it is desired to operate the machine with the blade raised and the hopper down, this may be readily done through independent adjustment of the blade.

The above described construction will maintain the circumferential face of the drum evenly dusted with flour and will prevent the accumulation on said face of dirt or hard lumps of dough which might find their way into the loaves.

What I claim as my invention is:

1. In a loaf molding machine, the combination with a rotary drum, of a scraper blade engageable with the circumferential face of said drum, and means for cooling said blade.

2. In a loaf molding machine, the combination with a rotary drum, and a scraper blade engageable with the circumferential face of said drum, of means for discharging a liquid cooling agent upon the blade.

3. In a loaf molding machine, the combination with a rotary drum, of a scraping blade engageable with a circumferential face of said drum, and adjustable between positions wherein it is respectively engaged with and disengaged from the drum, and spring means for holding said blade in either of said positions.

4. In a loaf molding machine, the combination with a rotary drum, and a scraper blade adjustable into and out of engagement with said drum, means for supplying a liquid cooling agent to said blade, and means for automatically cutting off the supply of said agent to the blade when the latter is adjusted out of engagement with the drum.

5. In a loaf molding machine, the combination with a rotary drum, of a scraper blade engageable with a circumferential face of said drum, said blade being provided with trunnions, supporting members for said blade at each side of the drum respectively formed with slots engageable by said trunnions to guide the blade between its two positions, and means carried by said supporting members for yieldably engaging said trunnions in the two positions of the blade.

6. In a loaf-molding machine, the combination with a rotary drum, of a flour hopper mounted above said drum and normally adjacent thereto, a scraper blade adapted to engage the drum, means for vertically adjusting said hopper, and means for adjusting said blade vertically independently of the hopper.

In testimony whereof I affix my signature.

JAN ARTKOP.